(12) United States Patent
Nagabuchi

(10) Patent No.: US 7,410,274 B2
(45) Date of Patent: Aug. 12, 2008

(54) LIGHT GUIDING UNIT, LIGHT GUIDING UNIT ASSEMBLY, AND LAMP COMPRISING THE SAME

(75) Inventor: Daisuke Nagabuchi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 178 days.

(21) Appl. No.: 11/276,562

(22) Filed: Mar. 6, 2006

(65) Prior Publication Data
US 2006/0198158 A1 Sep. 7, 2006

(30) Foreign Application Priority Data
Mar. 4, 2005 (JP) ............................. 2005-061360

(51) Int. Cl.
*F21V 5/00* (2006.01)

(52) U.S. Cl. ................... 362/332; 362/299; 362/300; 362/327; 362/329; 362/346

(58) Field of Classification Search ............... 257/98, 257/100; 313/498, 512; 362/297, 300–301, 362/326–327, 329, 332, 346
See application file for complete search history.

(56) References Cited

U.S. PATENT DOCUMENTS

| | | | | |
|---|---|---|---|---|
| 1,837,091 A | * | 12/1931 | Adams | .................. 362/301 |
| 4,767,172 A | | 8/1988 | Nichols et al. | |
| 5,555,161 A | | 9/1996 | Roe et al. | |
| 6,097,549 A | | 8/2000 | Jenkins et al. | |
| 6,356,394 B1 | | 3/2002 | Glienicke | |
| 6,637,923 B2 | | 10/2003 | Amano | |

| | | | |
|---|---|---|---|
| 2004/0012976 A1 | | 1/2004 | Amano |

FOREIGN PATENT DOCUMENTS

| | | |
|---|---|---|
| EP | 1126209 | 8/2001 |
| JP | 200359312 | 2/2003 |

OTHER PUBLICATIONS

Search Report for European Patent App. No. 06004243 (Jun. 6, 2007).

* cited by examiner

*Primary Examiner*—Sandra O'Shea
*Assistant Examiner*—Jason Moon Han
(74) *Attorney, Agent, or Firm*—Cermak Kenealy & Vaidya LLP

(57) ABSTRACT

A light guiding unit is provided which can reflect light from one light source such that a plurality of irradiated lights can be intermittently viewed, while allowing substantially all portions of the plurality of irradiated lights to be substantially uniform. The light guiding unit can include an input portion where light from a light source is input, a first reflecting portion that has reflecting surfaces which divide light from the input portion into a plurality of directions (e.g., six directions), and then radially reflects the light. A second reflecting portion can be provided that has reflecting surfaces which reflect light from each of the reflecting surfaces of the first reflecting portion along the principal optical axis. An irradiation portion can be provided that has irradiation surfaces which irradiate light from each of the reflecting surfaces of the second reflecting portion. The irradiation surfaces can be separated from each other on a circumference substantially centered on the principal optical axis. Each of the six light paths from the first reflecting portion up to the irradiation surfaces can be arranged so as to have a rotationally substantially symmetric relationship of 60° substantially centered on the principal optical axis.

19 Claims, 8 Drawing Sheets

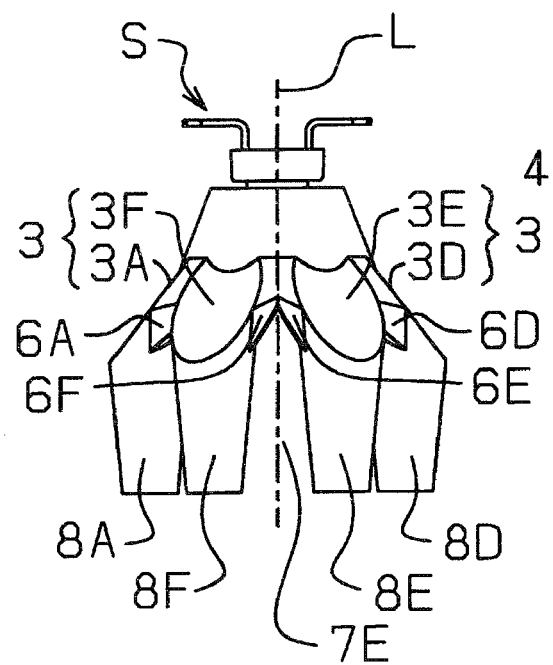
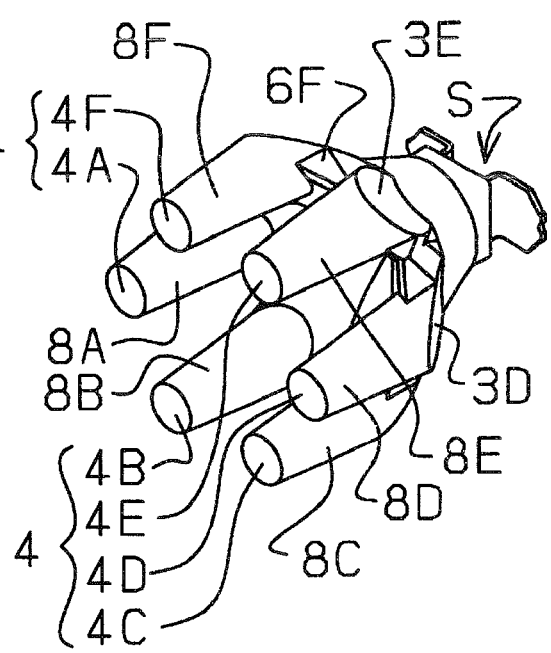
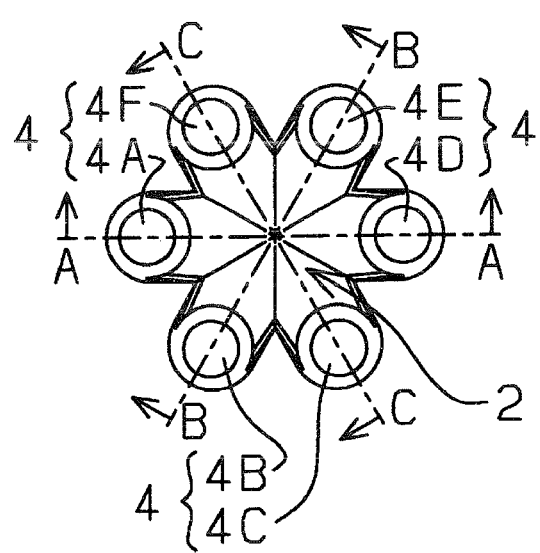
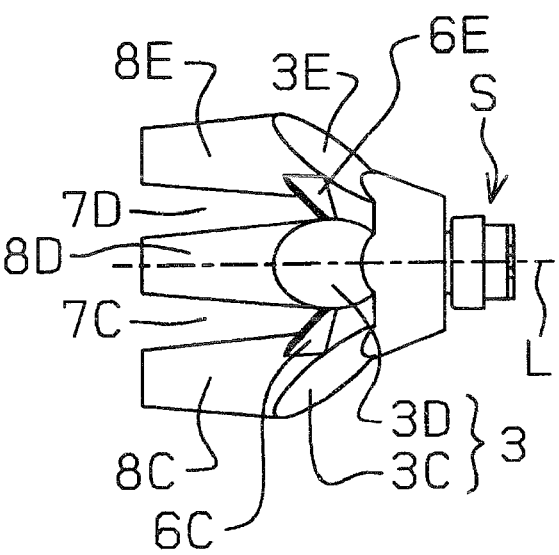

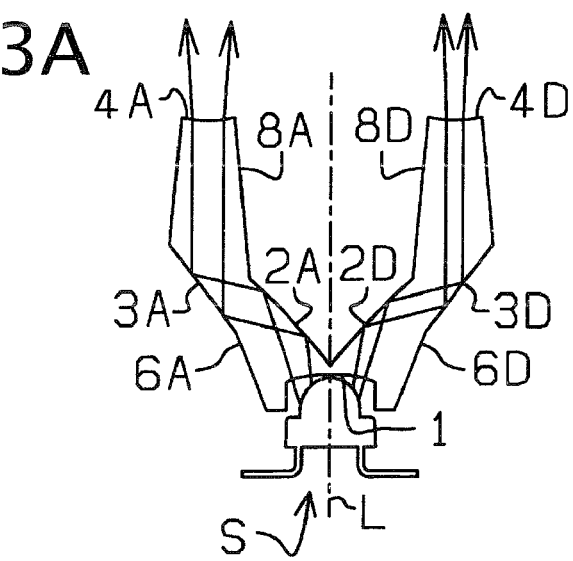
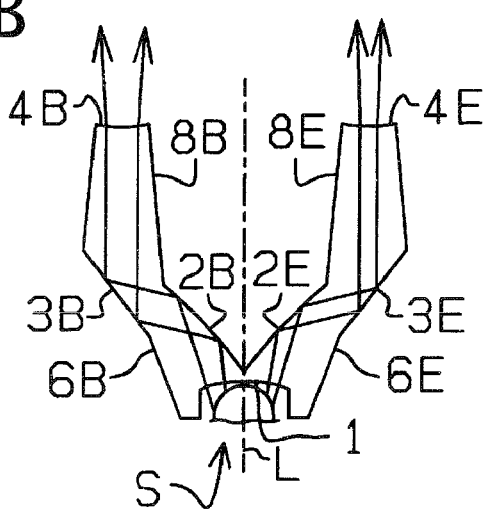
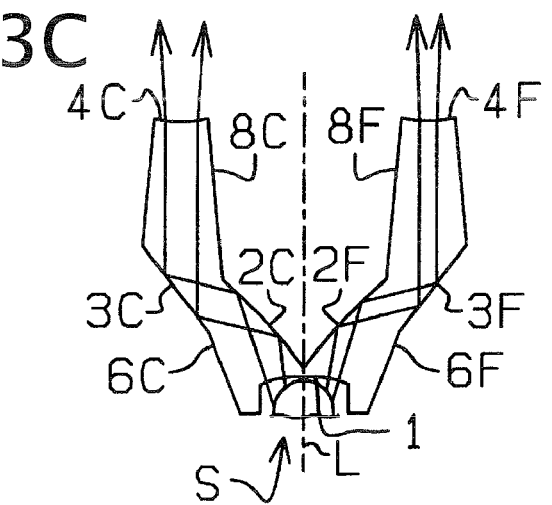

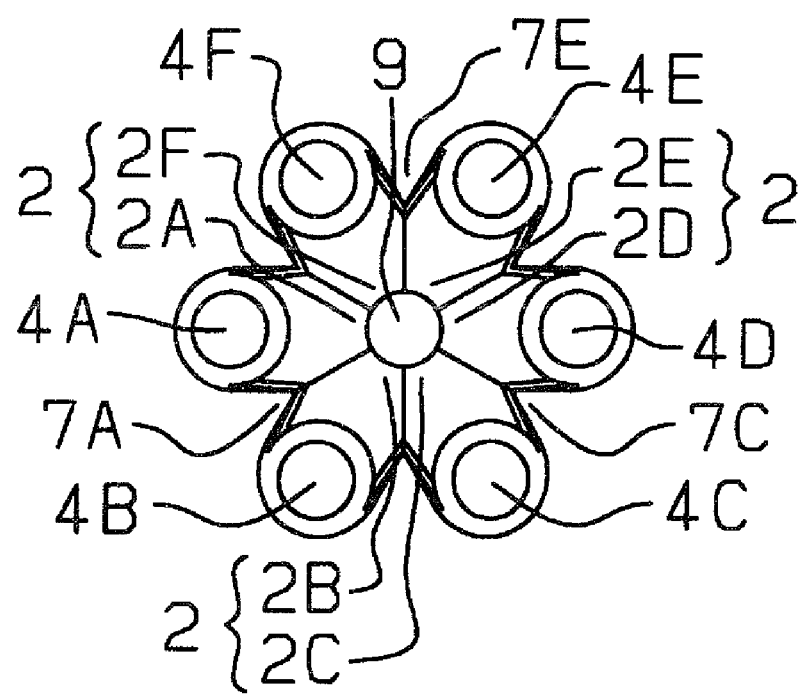

LIGHT GUIDING UNIT, LIGHT GUIDING UNIT ASSEMBLY, AND LAMP COMPRISING THE SAME

This application claims the priority benefit under 35 U.S.C. §119 of Japanese Patent Application No. 2005-061360 filed on Mar. 4, 2005, which is hereby incorporated in its entirety by reference.

BACKGROUND OF THE INVENTION

1. Field

The disclosed subject matter relates to a light guiding unit, a light guiding unit assembly, and a lamp comprising the same wherein a plurality of irradiated light paths can be intermittently illuminated by reflecting light from one light source while allowing all or substantially all portions of the plurality of irradiated light paths to be uniformly illuminated.

In more detail, the lamp can be used for vehicles, amusement machines, general lighting, decorations, and the like.

2. Description of the Related Art

Conventionally, lenses are known to include: an input surface where light from a light source is input; a first reflecting region that has a reflecting surface for radially reflecting the light from the input surface; a second reflecting region that has a circular (arc-shaped) reflecting surface for reflecting light from the reflecting surface of the first reflecting region in the direction of the principal optical axis of the light source; and an irradiation surface for irradiating light from the circular (arc-shaped) reflecting surface of the second reflecting region. FIG. 1 of U.S. Pat. No. 6,097,549 shows an example of this type of lens, and is hereby incorporated in its entirety by reference.

The lens shown in FIG. 1 of U.S. Pat. No. 6,097,549 radially reflects the light from the light source at the first reflecting region but does not divide and reflect the light. Because the reflecting surface and the irradiation surface of the second reflecting region are continuously formed in a circular shape, the light irradiated from the irradiation surface is seen in a circular shape. As a result, with the lens shown in FIG. 1 of U.S. Pat. No. 6,097,549, it is not possible for the light from the irradiation surface to be intermittently seen.

In addition, in the lens shown in FIG. 9 and FIG. 10 of U.S. Pat. No. 6,097,549 the light irradiated from the irradiation surface cannot be seen radially but can be seen linearly. As a result, the lens shown in FIG. 9 and FIG. 10 of U.S. Pat. No. 6,097,549 does not allow the light irradiated from the irradiation surface to be intermittently seen.

In contrast, a vehicle lamp is described in Japanese Patent Laid-Open Publication No. 2003-59312 that allows irradiated light to be intermittently seen/illuminated, for example. U.S. Pat. No. 6,637,923 is an English language equivalent to Japanese Patent Laid-Open Publication No. 2003-59312, and is hereby incorporated in its entirety by reference. In the vehicle lamp described in Japanese Patent Laid-Open Publication No. 2003-59312, there is a design wherein each portion of the plurality of irradiated lights, from among the plurality of irradiated lights that are arranged in a grid shape and can be seen glittering intermittently, arranged from the top to the bottom in FIG. 3 of Japanese Patent Laid-Open Publication No. 2003-59312 can be uniformly seen. However, each portion of the plurality of irradiated lights arranged from left to right in FIG. 3 of Japanese Patent Laid-Open Publication No. 2003-59312 cannot be uniformly seen. In more detail, the irradiated light at the left edge and the right edge, from among the plurality of irradiated lights arranged from left to right in FIG. 3 of Japanese Patent Laid-Open Publication No. 2003-59312, becomes darker than the irradiated light at the center. In other words, according to the vehicle lamp described in Japanese Patent Laid-Open Publication No. 2003-59312, each portion of the plurality of irradiated lights could not be made uniform at all.

Namely, when a plurality of irradiated lights can be intermittently seen by reflecting light from one light source in conventional technology, each portion of the plurality of irradiated light could not be made uniform.

SUMMARY

In view of the foregoing and other problems and concerns, one of a light guiding unit, a light guiding unit assembly, and a lamp comprising the same can be provided wherein a plurality of irradiated light can be intermittently seen by reflecting light from a single light source while allowing substantially all portions of the plurality of irradiated light to be uniformly seen.

According to one aspect of the disclosed subject matter, a light guiding unit is provided. The light guiding unit can include: an input member where light from a light source is input; a first reflecting member having three or more "primary" reflecting surfaces to divide light from the input member into three or more directions and radially reflect the light; a second reflecting member having three or more "secondary" reflecting surfaces provided equal in number to the reflecting surfaces of the first reflecting member and in correspondence to the three or more reflecting surfaces of the first reflecting member in order to reflect light from each reflecting surface of the first reflecting member in a direction of a principal optical axis of the light source; and an irradiation member having three or more irradiation surfaces provided equal in number to the reflecting surfaces of the second reflecting member and in correspondence to the three or more reflecting surfaces of the second reflecting member in order to irradiate light from each reflecting surface of the second reflecting member. The light guiding unit can be configured such that the three or more irradiation surfaces of the irradiation member are separated from each other on a circumference centered on the principal optical axis of the light source, and the three or more reflecting surfaces of the second reflecting member and the three or more irradiation surfaces of the irradiation member can be arranged such that three or more light paths from the first reflecting member up to the three or more irradiation surfaces of the irradiation member have a rotationally symmetric relationship with each other centered on the principal optical axis of the light source.

In the light guiding unit described above, an optical isolation space can be arranged between: 1) the light path extending from one reflecting surface from among the three or more reflecting surfaces of the first reflecting member up to the reflecting surface of the second reflecting member provided in correspondence to the one reflecting surface mentioned above, and 2) the light path extending from another reflecting surface from among the three or more reflecting surfaces of the first reflecting member up to the reflecting surface of the second reflecting member provided in correspondence to the other reflecting surface mentioned above.

In the light guiding unit described above, the light path extending from one reflecting surface from among the three or more reflecting surfaces of the first reflecting member up to the reflecting surface of the second reflecting member provided in correspondence to the one reflecting surface can be formed by a member with an approximate column shape, and the light path extending from another reflecting surface from among the three or more reflecting surfaces of the first reflecting member up to the reflecting surface of the second reflecting member provided in correspondence to the other reflecting surface can be formed by another member with an approximate column shape that branches from the member with the approximate column shape at the position of the first reflecting member.

In the light guiding unit described above, an optical isolation space may be arranged between the light path extending from one reflecting surface from among the three or more reflecting surfaces of the second reflecting member up to the irradiation surface of the irradiation member provided in correspondence to the one reflecting surface and the light path extending from another reflecting surface from among the three or more reflecting surfaces of the second reflecting member up to the irradiation surface of the irradiation member provided in correspondence to the other reflecting surface.

In the light guiding unit described above, the light path extending from one reflecting surface from among the three or more reflecting surfaces of the second reflecting member up to the irradiation surface of the irradiation member provided in correspondence to the one reflecting surface may be formed by a member with an approximate column shape and the light path extending from another reflecting surface from among the three or more reflecting surfaces of the second reflecting member up to the irradiation surface of the irradiation member provided in correspondence to the other reflecting surface may be formed by another member with an approximate column shape.

In the light guiding unit described above, a light transmission member that allows light to transmit from the light source may be provided on the principal optical axis of the light source, the first reflecting member may be arranged so as to surround the light transmission member, six reflecting surfaces may be provided on the first reflecting member to divide the light from the input member into six directions and then radially reflect the light, and the six reflecting surfaces of the first reflecting member may be arranged such that they have a rotationally symmetric relationship of 60° centered on the principal optical axis of the light source.

In the light guiding unit described above, a light transmission quantity through the light transmission member may be set such that the irradiation light from each irradiation surface of the irradiation member and the irradiation light from the irradiation surface of the light transmission member become substantially uniform.

In the light guiding unit described above, each irradiation surface of the irradiation member and/or the irradiation surface of the light transmission member may be formed in a convex shape, flat shape and/or a concave shape.

In the light guiding unit described above, an exterior shape of each irradiation surface of the irradiation member and/or the irradiation surface of the light transmission member may be formed in a polygon shape, a cylindrical shape, and other desired shapes in accordance with the application of the lighting device.

In the light guiding unit described above, a cover of the light source and the input member may be formed integrally.

In the light guiding unit described above, each reflecting surface of the first reflecting member may be formed by a flat surface and each reflecting surface of the second reflecting member may be formed by a parabolic surface obtained by rotating a substantial parabola (e.g., an almost parabolic shape or totally parabolic shape) centered on a predetermined axis.

According to another aspect of the disclosed subject matter, a light guiding unit assembly is provided. The light guiding unit assembly can include a plurality of the light guiding units with any one or more of the above features. The light guiding units can be connected, and the two adjacent light guiding units can share one or two irradiation surfaces.

According to still another aspect of the disclosed subject matter, a lamp is provided. The lamp can include the light guiding unit or the light guiding unit assembly with any one or more of the above features.

In another aspect, the light guiding unit and the light guiding unit assembly described above can be formed as a lens for use in a lamp, such as a vehicle lamp and the like.

The light guiding unit according to the first aspect of the disclosed subject matter can include: an input member where light from a light source is input; a first reflecting member that has three or more reflecting surfaces to divide light from the input member into three or more directions and radially reflect the light; a second reflecting member that has three or more reflecting surfaces provided equal in number to reflecting surfaces of the first reflecting member and in correspondence to the three or more reflecting surfaces of the first reflecting member for the purpose of reflecting light from each reflecting surface of the first reflecting member in the direction of the principal optical axis of the light source; and an irradiation member that has three or more irradiation surfaces provided equal in number to reflecting surfaces of the second reflecting member and in correspondence to the three or more reflecting surfaces of the second reflecting member for the purpose of irradiating light from each reflecting surface of the second reflecting member. The three or more irradiation surfaces of the irradiation member can be separated from each other on a circumference centered on the principal optical axis of the light source and the three or more reflecting surfaces of the second reflecting member and the three or more irradiation surfaces of the irradiation member can be arranged such that the three or more light paths from the first reflecting member up to the three or more irradiation surfaces of the irradiation member have a rotationally symmetric relationship with each other centered on the principal optical axis of the light source.

In other words, in the light guiding unit described above the three or more irradiation surfaces of the irradiation member can be arranged so as to be separated from each other on the circumference centered on the principal optical axis of the light source. Because of this, the plurality of irradiated lights irradiated from the three or more irradiation surfaces can be intermittently illuminated/viewed.

In addition, in the light guiding unit described above, the three or more reflecting surfaces of the second reflecting member and the three or more irradiation surfaces of the irradiation member can be arranged such that each of the three or more light paths that extend from the first reflecting member up to the three or more irradiation surfaces of the irradiation member have a rotationally symmetric relationship with each other centered on the principal optical axis of the light source. Because of this, each portion of the plurality of irradiated lights can be substantially uniformly seen/viewed.

Namely, in the light guiding unit described above, the plurality of irradiated light can be intermittently seen by reflecting light from one light source while allowing substantially all portions of the plurality of irradiated lights to be substantially uniformly viewed or illuminated.

As an experiment, if the light path extending from one reflecting surface from among the three or more reflecting surfaces of the first reflecting member up to the reflecting surface of the second reflecting member are not optically separated from adjacent light paths, there is a possibility that light may escape from inside of the light path to an area outside of the light path, or the light may leak from outside of the light path to an area inside the light path. As a result, each portion of the plurality of irradiated light may not be uniformly illuminated or seen.

Taking this point into consideration, in the light guiding unit described above, the optical isolation space can be arranged between: 1) the light path extending from one reflecting surface from among the three or more reflecting surfaces of the first reflecting member up to the reflecting surface of the second reflecting member provided in correspondence to the one reflecting surface mentioned above; and 2) the light path extending from another reflecting surface from among the three or more reflecting surfaces of the first reflecting member up to the reflecting surface of the second reflecting member provided in correspondence to the other reflecting surface mentioned above. In more detail, the light path extending from one reflecting surface from among the three or more reflecting surfaces of the first reflecting member up to the reflecting surface of the second reflecting member provided in correspondence to the one reflecting surface mentioned above can be formed by a member with an approximate column shape. The light path extending from another reflecting surface from among the three or more reflecting surfaces of the first reflecting member up to the reflecting surface of the second reflecting member provided in correspondence to the other reflecting surface mentioned above can be formed by another member with an approximate column shape that branches from the member with the approximate column shape at the position of the first reflecting member. Because of this, it is possible to reduce the danger of light from an area outside of the light path extending from one reflecting surface from among the three or more reflecting surfaces of the first reflecting member up to the reflecting surface of the second reflecting member provided in correspondence to the one reflecting surface mentioned above leaking to an area inside the light path or light from inside of the light path escaping to an area outside of the light path.

Furthermore, as an experiment, if the light path extending from one reflecting surface from among the three or more reflecting surfaces of the second reflecting member up to the irradiation surface of the irradiation member provided in correspondence to the one reflecting surface mentioned above is not optically separated from adjacent light paths, there is a possibility that light may escape from an area inside of the light path to an area outside of the light path. Alternatively the light may leak from an area outside of the light path to an area inside of the light path, and as a result each portion of the plurality of irradiated lights may not be uniformly illuminated or seen.

Taking this point into consideration, in the light guiding unit described above, the optical isolation space can be arranged between: 1) the light path extending from one reflecting surface from among the three or more reflecting surfaces of the second reflecting member up to the irradiation surface of the irradiation member provided in correspondence to the one reflecting surface mentioned above; and 2) the light path extending from another reflecting surface from among the three or more reflecting surfaces of the second reflecting member up to the irradiation surface of the irradiation member provided in correspondence to the other reflecting surface mentioned above. In more detail, the light path extending from one reflecting surface from among the three or more reflecting surfaces of the second reflecting member up to the irradiation surface of the irradiation member provided in correspondence to the one reflecting surface mentioned above can be formed by a member with an approximate column shape. The light path extending from another reflecting surface from among the three or more reflecting surfaces of the second reflecting member up to the irradiation surface of the irradiation member provided in correspondence to the other reflecting surface mentioned above can be formed by another member with an approximate column shape. Because of this, it is possible to reduce the danger of light from outside of the light path extending from one reflecting surface from among the three or more reflecting surfaces of the second reflecting member up to the irradiation surface of the irradiation member provided in correspondence to the one reflecting surface mentioned above from leaking to an area inside of the light path, and/or prevent light from inside of the light path from escaping to the outside of the light path.

In the light guiding unit described above, the light transmission member that allows light to transmit from the light source may be provided on a principal optical axis of the light source such that the first reflecting member is surrounded. Six reflecting surfaces may be provided on the first reflecting member to divide the light from the input member into six directions and then radially reflect the light. The six reflecting surfaces of the first reflecting member may be arranged such that they have a rotationally symmetric relationship of 60° centered on the principal optical axis of the light source. In more detail, the light transmission quantity of the light transmission member may be set so as to make the irradiation light from each of the six reflecting surfaces of the irradiation member and the irradiation light from the irradiation surface of the light transmission member substantially uniform. Because of this, uniform light from the six vertices of a true hexagon and from the center of this hexagon (a total of seven points) can be irradiated using one light source. As a result, substantially uniform light can be irradiated from all points arranged at regular intervals, and include seven times the number of light illuminating sources as there are guiding units. The light guiding units can be arranged with the specific features described above in order to form a true triangle using two irradiation surfaces of one light guide and one irradiation surface of another light guide, for example.

In the light guiding unit described above, each irradiation surface of the irradiation member and/or the irradiation surface of the light transmission member can be formed in a convex shape and/or a concave shape. Because of this, light can be radially irradiated at each irradiation surface of the irradiation member and/or the irradiation surface of the light transmission member. This makes it possible to intermittently see a plurality of irradiated light from a position other than the principal optical axis of the light source while allowing all portions of the plurality of irradiated light to be uniformly seen.

In the light guiding unit described above, the exterior shape of each irradiation surface of the irradiation member and/or the irradiation surface of the light transmission member can be formed in a polygon shape. Because of this, the distribution of light emitted from each irradiation surface of the irradiation member and/or the irradiation surface of the light transmission member can be more easily controlled than when the exterior shape of each irradiation surface of the irradiation member and/or the irradiation surface of the light transmission member is formed in a circular shape or when the irradiation surface of the irradiation member is formed in an annular shape.

In the light guiding unit described above, the cover of the light source and the input member can be formed integrally. Because of this, the assembly cost of the light source and the light guiding unit can be reduced more than when the cover of the light source and the input member are formed separately.

In the light guiding unit described above, each reflecting surface of the first reflecting member can be formed by a flat surface and each reflecting surface of the second reflecting member can be formed by a parabolic surface obtained by rotating a parabolic surface centered on a predetermined axis. In other words, each reflecting surface of the first reflecting member located close to the principal optical axis of the light source and arranged in a comparatively narrow region difficult to process, can be formed by a flat surface that easily produces comparative accuracy. Furthermore, each of these reflecting surfaces can be separated from the principal optical axis of the light source. In addition, each reflecting surface of the second reflecting member, arranged in a comparatively wide region easy to process, can be formed by a parabolic surface that does not easily produce comparative accuracy. Because of this, the accuracy of the reflecting surface of the first reflecting member and the reflecting surface of the second reflecting member can be improved while controlling manufacturing costs as compared to when each reflecting surface of the first reflecting member is formed by a parabolic surface and each reflecting surface of the second reflecting member is formed by a level surface.

In the light guiding unit assembly described above, multiple light guiding units can be connected and two adjacent light guiding units can share one or two irradiation surfaces. Because of this, the assembly characteristics can be improved as compared to the case where each of the multiple light guiding units is individually mounted, and the lamp can thus be more easily assembled.

In the lamp described above, a plurality of irradiated lights can be intermittently viewed by reflecting light from one light source while allowing substantially all portions of the plurality of irradiated lights to be substantially uniformly seen.

BRIEF DESCRIPTION OF THE DRAWINGS

These and other characteristics and features of the disclosed subject matter will become clear from the following description with reference to the accompanying drawings, wherein:

FIG. 1A is a plan view of a lens (or a light guiding unit) and an LED unit of a first exemplary embodiment, FIG. 1B is a perspective view of the lens and the LED unit of the first exemplary embodiment, FIG. 1C is a front view of the lens of the first exemplary embodiment, and FIG. 1D is a right-side view of the lens and the LED unit of the first exemplary embodiment;

FIG. 3A is a cross-sectional view of the lens and the LED unit taken along the line A-A of FIG. 1C, FIG. 3B is a cross-sectional view of the lens and the LED unit taken along the line B-B of FIG. 1C, and FIG. 3C is a cross-sectional view of the lens and the LED unit taken along the line C-C of FIG. 1C;

FIG. 5 is a front view of a lens according to a sixth exemplary embodiment;

DETAILED DESCRIPTION OF EXEMPLARY EMBODIMENTS

In the following, a first exemplary embodiment of a light guiding unit or lens will be described. Incidentally, the light guiding unit of the first exemplary embodiment and those of the following exemplary embodiments can be used for lamps of vehicles, traffic lights, amusement machines, general lighting, and decorations, and may be implemented as a lens.

Figure 2A:
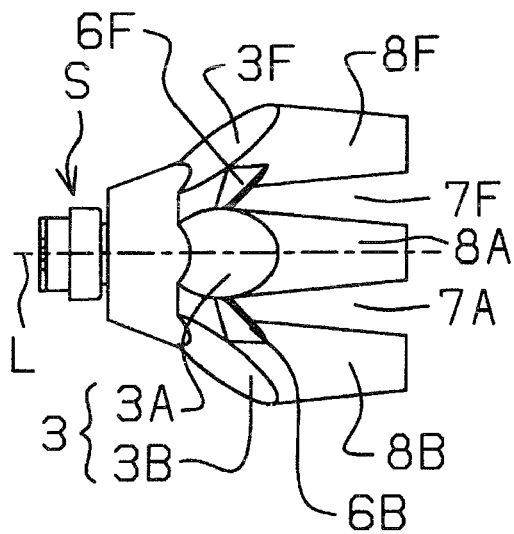
FIG. 2A is a left-side view of the lens and the LED unit of the first exemplary embodiment of the invention.
Figure 2B:
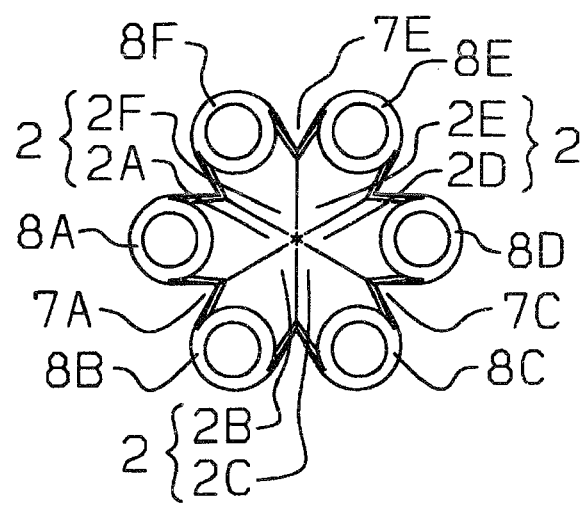
FIG. 2B is a front view of the lens of the first exemplary embodiment.
Figure 2C:
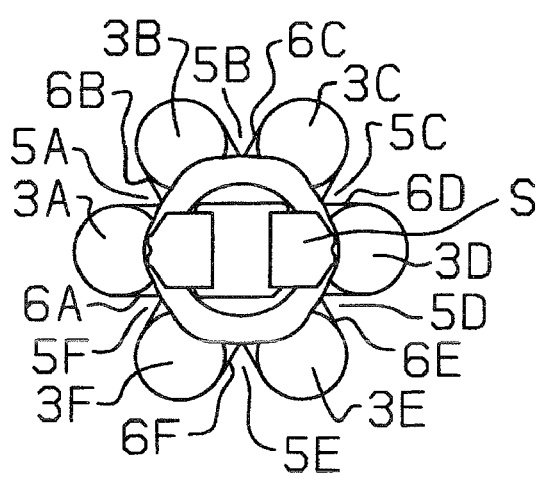
FIG. 2C is a rear view of the lens and the LED unit of the first exemplary embodiment.
Figure 2D:
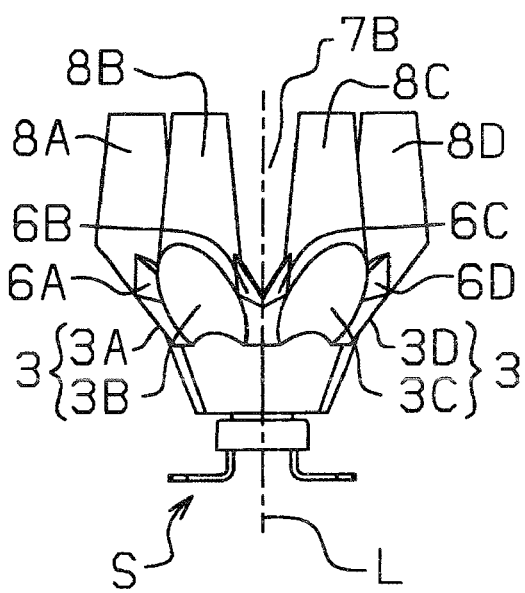
FIG. 2D is a bottom view of the lens and the LED unit of the first exemplary embodiment.

FIGS. 1A to 1D show various views including a plan view of the light-guiding unit, or a lens (hereinafter, referred to as simply "lens") and the LED unit of the first exemplary embodiment. In more detail, FIG. 1A is a plan view of the lens and the LED unit of the first exemplary embodiment, FIG. 1B is a perspective view thereof, FIG. 1C is a front view thereof, and FIG. 1D is a right-side view thereof. FIGS. 2A to 2D show various views including a left side view of the lens and the LED unit of the first exemplary embodiment. In more detail, FIG. 2A is a left-side view of the lens and the LED unit of the first exemplary embodiment, FIG. 2B is a front view of the lens thereof, FIG. 2C is a rear view thereof, and FIG. 2D is a bottom view thereof. FIGS. 3A to 3C show various views including a cross section of the lens and the LED unit of FIG. 1C. In more detail, FIG. 3A is a cross-sectional view of the lens and the LED unit taken along the line A-A of FIG. 1C, FIG. 3B is a cross-sectional view thereof taken along the line B-B of FIG. 1C, and FIG. 3C is a cross-sectional view thereof taken along the line C-C of FIG. 1C.

In FIG. 1A to FIG. 3C, the reference symbol S represents the LED unit with an internal LED (not shown in figure) that functions as the light source and the reference symbol L represents the principal optical axis of the light source. In addition, the reference numeral 1 represents an input member where light from the light source is input (see FIGS. 3A to 3C), and the reference numeral 2 represents a first reflecting member that divides the light from the input member into six directions and then radially reflects the light. Six reflecting surfaces 2A, 2B, 2C, 2D, 2E, and 2F can be formed on the first reflecting member 2, and arranged such that they have a rotationally symmetric relationship of 60° substantially centered on the principal optical axis of the light source. The reflecting surfaces 2A, 2B, 2C, 2D, 2E, and 2F can be formed by parabolic surfaces obtained by rotating a parabola substantially centered on a predetermined axis in order to reflect the irradiated light incoming from the light source and form it into parallel light. The angle of incidence is set such that substantially all the incoming light from the light source is reflected on each of the reflecting surfaces 2A, 2B, 2C, 2D, 2E, and 2F.

Furthermore, in FIG. 1A to FIG. 3C, the reference numeral 3 represents a second reflecting member that reflects light from the six reflecting surfaces 2A, 2B, 2C, 2D, 2E, and 2F of the first reflecting member 2 in the direction of the principal optical axis L of the light source. Six reflecting surfaces 3A, 3B, 3C, 3D, 3E, and 3F can be formed on the second reflecting member 3, and arranged such that they have a rotationally symmetric relationship of 60° substantially centered on the principal optical axis L of the light source. In more detail, the reflecting surfaces 3A, 3B, 3C, 3D, 3E, and 3F can be provided in correspondence to the reflecting surfaces 2A, 2B, 2C, 2D, 2E, and 2F of the first reflecting member 2, respectively. The angle of incidence is set such that substantially all the incoming light from each of the reflecting surfaces 2A, 2B, 2C, 2D, 2E, and 2F is reflected on the corresponding one of the reflecting surfaces 3A, 3B, 3C, 3D, 3E, and 3F.

Even further, in FIG. 1A to FIG. 3C, the reference numeral 4 represents an irradiation member that irradiates light from the respective reflecting surfaces 3A, 3B, 3C, 3D, 3E, and 3F of the second reflecting member 3. Six irradiation surfaces 4A, 4B, 4C, 4D, 4E, and 4F can be formed on the irradiation surface 4, and can be arranged such that they have a rotationally symmetric relationship of 60° substantially centered on the principal optical axis L of the light source. In more detail, the irradiation surfaces 4A, 4B, 4C, 4D, 4E, and 4F can be provided in correspondence to the reflecting surfaces 3A, 3B, 3C, 3D, 3E, and 3F of the second reflecting member 3, respectively. In even more detail, the six irradiation surfaces 4A, 4B, 4C, 4D, 4E, and 4F of the irradiation surface 4 can be arranged so as to be separated from each other at regular intervals on the circumference substantially centered on the principal optical axis L of the light source as shown in FIG. 1C.

Additionally, in FIG. 1A to FIG. 3C (and in particular FIGS. 3A to 3C), the reference numerals 6A, 6B, 6C, 6D, 6E, and 6F represent members each having an approximate column shape, that form respective light paths extending from the reflecting surfaces 2A, 2B, 2C, 2D, 2E, and 2F up to the reflecting surfaces 3A, 3B, 3C, 3D, 3E, and 3F, respectively. The members 6A, 6B, 6C, 6D, 6E, and 6F branch from each other at the position of the first reflecting member 2. In addition, the members 6A, 6B, 6C, 6D, 6E, and 6F can be formed such that they have a rotationally symmetric relationship of 60° substantially centered on the principal optical axis L of the light source.

Additionally, in FIG. 1A to FIG. 3C (and in particular FIG. 2C), the reference numerals 5A, 5B, 5C, 5D, 5E, and 5F are isolation spaces which optically isolate the members 6A, 6B, 6C, 6D, 6E, and 6F from each other, respectively. In more detail, the isolation space 5A isolates the light that travels inside the member with an approximate column shape 6A and the light that travels inside the member with an approximate column shape 6B, the isolation space 5B isolates the light that travels inside the member with an approximate column shape 6B and the light that travels inside the member with an approximate column shape 6C, the isolation space 5C isolates the light that travels inside the member with an approximate column shape 6C and the light that travels inside the member with an approximate column shape 6D, the isolation space 5D isolates the light that travels inside the member with an approximate column shape 6D and the light that travels inside the member with an approximate column shape 6E, the isolation space 5E isolates the light that travels inside the member with an approximate column shape 6E and the light that travels inside the member with an approximate column shape 6F, and the isolation space 5F isolates the light that travels inside the member with an approximate column shape 6F and the light that travels inside the member with an approximate column shape 6A.

Even further, in FIG. 1A to FIG. 3C (and in particular FIGS. 3A to 3C), the reference numerals 8A, 8B, 8C, 8D, 8E, and 8F represent members each having an approximate column shape, that form respective light paths extending from the reflecting surfaces 3A, 3B, 3C, 3D, 3E, and 3F up to the irradiation surfaces 4A, 4B, 4C, 4D, 4E, and 4F, respectively. These members 8A, 8B, 8C, 8D, 8E, and 8F extend substantially parallel to the principle optical axis L of the light source. In addition, the members 8A, 8B, 8C, 8D, 8E, and 8F can also be formed such that they have a rotationally symmetric relationship of 60° substantially centered on the principal optical axis L of the light source.

And even further, in FIG. 1A to FIG. 3C (and in particular FIG. 1A, FIG. 1D, FIG. 2A, FIG. 2B, and FIG. 2D), the reference numerals 7A, 7B, 7C, 7D, 7E, and 7F represent isolation spaces which optically isolate the members 8A, 8B, 8C, 8D, 8E, and 8F from each other, respectively. In more detail, the isolation space 7A isolates the light that travels inside the member with an approximate column shape 8A and the light that travels inside the member with an approximate column shape 8B, the isolation space 7B isolates the light that travels inside the member with an approximate column shape 8B and the light that travels inside the member with an approximate column shape 8C, the isolation space 7C isolates the light that travels inside the member with an approximate column shape 8C and the light that travels inside the member with an approximate column shape 8D, the isolation space 7D isolates the light that travels inside the member with an approximate column shape 8D and the light that travels inside the member with an approximate column shape 8E, the isolation space 7E isolates the light that travels inside the member with an approximate column shape 8E and the light that travels inside the member with an approximate column shape 8F, and the isolation space 7F isolates the light that travels inside the member with an approximate column shape 8F and the light that travels inside the member with an approximate column shape 8A.

As shown in FIG. 1C, FIG. 2B, FIG. 2C, and FIGS. 3A to 3C, with the lens of the first exemplary embodiment the light path of input member 1→reflecting surface 2A→reflecting surface 3A→irradiation surface 4A, the light path of input member 1→reflecting surface 2B→reflecting surface 3B→irradiation surface 4B, the light path of input member 1→reflecting surface 2C→reflecting surface 3C→irradiation surface 4C, the light path of input member 1→reflecting surface 2D→reflecting surface 3D→irradiation surface 4D, the light path of input member 1→reflecting surface 2E→reflecting surface 3E→irradiation surface 4E, and the light path of input member 1→reflecting surface 2F→reflecting surface 3F→irradiation surface 4F are formed such that they have a substantially rotationally symmetric relationship of 60° substantially centered on the principal optical axis L of the light source.

In addition, as shown in FIGS. 3A to 3C, with the lens of the first exemplary embodiment, the irradiation surfaces 4A, 4B, 4C, 4D, 4E, and 4F can be formed in a concave shape. Because of this, light is irradiated from the upper edge (see FIG. 1C) of each of the irradiation surfaces 4A, 4B, 4C, 4D, 4E, and 4F towards the forward upper side of FIG. 1C at an angle of, for example, 15° with respect to the principal optical axis L of the light source. Light is also irradiated from the right edge (see FIG. 1C) of each of the irradiation surfaces 4A, 4B, 4C, 4D, 4E, and 4F towards the forward right side of FIG. 1C at an angle of, for example, 45° with respect to the principal optical axis L of the light source. In addition, light is irradiated from the lower edge (see FIG. 1C) of each of the irradiation surfaces 4A, 4B, 4C, 4D, 4E, and 4F towards the forward lower side of FIG. 1C at an angle of, for example, 15° with respect to the principal optical axis L of the light source. And even further, light is also irradiated from the left edge (see FIG. 1C) of each of the irradiation surfaces 4A, 4B, 4C, 4D, 4E, and 4F towards the forward left side of FIG. 1C at an angle of, for example, 45° with respect to the principal optical axis L of the light source. In other words, according to the irradiation surfaces 4A, 4B, 4C, 4D, 4E, and 4F formed in a concave shape, the light that travels up to the irradiation surfaces 4A, 4B, 4C, 4D, 4E, and 4F parallel to the principal optical axis L of the light source can be refracted and then radially irradiated. Namely, the distribution of light can be controlled by the irradiation surfaces 4A, 4B, 4C, 4D, 4E, and 4F. The same effect can also be achieved even if the irradiation surfaces are formed in a convex shape.

As shown in FIG. 1C, because the irradiation surfaces 4A, 4B, 4C, 4D, 4E, and 4F of the irradiation member 4 are arranged separated from each other on the circumference substantially centered on the principal optical axis L of the light source with the lens of the first exemplary embodiment, the light irradiated from the six irradiation surfaces 4A, 4B, 4C, 4D, 4E, and 4F can be intermittently viewed/seen.

In addition, as shown in FIG. 1C, FIG. 2B, FIG. 2C, and FIGS. 3A to 3C, with the lens of the first exemplary embodiment, the six light paths from the respective reflecting surfaces 2A, 2B, 2C, 2D, 2E, and 2F of the first reflecting member 2 extending up to the respective irradiation surfaces 4A, 4B, 4C, 4D, 4E, and 4F of the irradiation member 4 are formed so as to have a rotationally symmetric relationship with each other substantially centered on the principal optical axis L of the light source. Because of this, substantially all the light irradiated from the irradiation surfaces 4A, 4B, 4C, 4D, 4E, and 4F can be substantially uniformly seen.

In other words, with the lens of the first exemplary embodiment a plurality of irradiated light can be intermittently seen by reflecting light from one light source while allowing substantially all portions of the plurality of irradiated lights to be substantially uniformly seen.

As described above, although the six irradiation surfaces 4A, 4B, 4C, 4D, 4E, and 4F are formed so as to have a rotationally symmetric relationship with each other substantially centered on the principal optical axis L of the light source with the lens of the first exemplary embodiment, with the second exemplary embodiment three of more irradiation surfaces can be formed in order to create a substantially rotationally symmetric relationship with each other substantially centered on the principal optical axis L of the light source. According to the lens of the second exemplary embodiment, a plurality of irradiated lights can be intermittently viewed by reflecting light from one light source while allowing substantially all portions of the plurality of irradiated lights to be substantially uniformly viewed in like manner to the lens of the first exemplary embodiment.

In addition, as shown in FIG. 2C and FIGS. 3A to 3C, with the lens of the first exemplary embodiment, the optical isolation space 5A is arranged between: 1) the light path extending from the reflecting surface 2A of the first reflecting member 2 up to the reflecting surface 3A of the second reflecting member 3; and 2) the light path extending from the reflecting surface 2B of the first reflecting member 2 up to the reflecting surface 3B of the second reflecting member 3. The optical isolation space 5F can be arranged between: 1) the light path extending from the reflecting surface 2A of the first reflecting member 2 up to the reflecting surface 3A of the second reflecting member 3; and 2) the light path extending from the reflecting surface 2F of the first reflecting member 2 up to the reflecting surface 3F of the second reflecting member 3. In more detail, the light path extending from the reflecting surface 2A of the first reflecting member 2 up to the reflecting surface 3A of the second reflecting member 3 can be formed by the member with an approximate column shape 6A. The light path extending from the reflecting surface 2B of the first reflecting member 2 up to the reflecting surface 3B of the second reflecting member 3 can be formed by the member with an approximate column shape 6B. The light path extending from the reflecting surface 2F of the first reflecting member 2 up to the reflecting surface 3F of the second reflecting member 3 can be formed by the member with an approximate column shape 6F. Consequently, it is possible to reduce the light that leaks from an area outside of the light path extending from the reflecting surface 2A of the first reflecting member 2 up to the reflecting surface 3A of the second reflecting member 3 to an area inside of the light path, or the light that leaks from an area inside of the light path to an area outside of the light path.

In addition, as shown in FIG. 1C, FIG. 2A, FIG. 2B, and FIGS. 3A to 3C, with the lens of the first exemplary embodiment the optical isolation space 7A can be arranged between: 1) the light path extending from the reflecting surface 3A of the second reflecting member 3 up to the irradiation surface 4A of the irradiation member 4, and 2) the light path extending from the reflecting surface 3B of the second reflecting member 3 up to the irradiation surface 4B of the irradiation member 4. The optical isolation space 7F can be arranged between: 1) the light path extending from the reflecting surface 3A of the second reflecting member 3 up to the irradiation surface 4A of the irradiation member 4; and 2) the light path extending from the reflecting surface 3F of the second reflecting member 3 up to the irradiation surface 4F of the irradiation member 4. In more detail, the light path extending from the reflecting surface 3A of the second reflecting member 3 up to the irradiation surface 4A of the irradiation member 4 is formed by the member with an approximate column shape 8A. The light path extending from the reflecting surface 3B of the second reflecting member 3 up to the irradiation surface 4B of the irradiation member 4 can be formed by the member with an approximate column shape 8B. The light path extending from the reflecting surface 3F of the second reflecting member 3 up to the irradiation surface 4F of the irradiation member 4 can be formed by the member with an approximate column shape 8F. Consequently, it is possible to reduce the light that leaks from outside of the light path extending from the reflecting surface 3A of the second reflecting member 3 up to the irradiation surface 4A of the irradiation member 4 to the inside of the light path. In addition, it is possible to reduce the light that leaks from inside of the light path to an area outside of the light path.

Also, as shown in FIGS. 3A to 3C, with the lens of the first exemplary embodiment, because the irradiation surfaces 4A, 4B, 4C, 4D, 4E, and 4F of the irradiation member 4 are formed in a concave shape, the light can be radially irradiated from the irradiation surfaces 4A, 4B, 4C, 4D, 4E, and 4F of the irradiation member 4. Because of this, a plurality of irradiated light can be intermittently seen by reflecting light from one light source while allowing substantially all portions of the plurality of irradiated light to be substantially uniformly viewed even if the viewing position shifts outside the principal optical axis L of the light source.

And even further, as shown in FIG. 1C, with the lens of the first exemplary embodiment, although the external shape of the irradiation surfaces 4A, 4B, 4C, 4D, 4E, and 4F of the irradiation member 4 are formed in a circular shape, with the lens of the third exemplary embodiment the external shape of the irradiation surfaces 4A, 4B, 4C, 4D, 4E, and 4F of the irradiation member 4 can be formed in a polygon such as a triangle or a square. According to the lens of the third exemplary embodiment, the distribution of the light irradiated from the irradiation surfaces 4A, 4B, 4C, 4D, 4E, and 4F of the irradiation member 4 can be more easily controlled than the case where the irradiation surfaces 4A, 4B, 4C, 4D, 4E, and 4F of the irradiation member 4 are formed in a circular shape as with the lens of the first exemplary embodiment.

In addition, as shown in FIG. 3A, although the cover of the LED (not shown in figure), that functions as a light source, is formed as one part of the LED unit in the lens of the first exemplary embodiment, as an alternative it is possible to integrally form the cover of the light source and the input member 1 in the lens of the fourth exemplary embodiment. According to the lens of the fourth exemplary embodiment, the assembly cost of the light source and the lens can be reduced as compared to the case where the cover of the light source and the input member 1 are formed separately.

Even further, as shown in FIGS. 3A to 3C, although the reflecting surfaces 2A, 2B, 2C, 2D, 2E, and 2F of the first reflecting member 2 can each be formed by a parabolic surface and the reflecting surfaces 3A, 3B, 3C, 3D, 3E, and 3F of the second reflecting member 3 can each be formed by a flat surface in the lens of the first exemplary embodiment, as an alternative it is possible to form the reflecting surfaces 2A, 2B, 2C, 2D, 2E, and 2F of the first reflecting member 2 by a flat surface and the reflecting surfaces 3A, 3B, 3C, 3D, 3E, and 3F of the second reflecting member 3 by a parabolic surface obtained by rotating a parabola centered on a predetermined axis. In other words, in the lens of the fifth exemplary embodiment, the reflecting surfaces 2A, 2B, 2C, 2D, 2E, and 2F of the first reflecting member 2 can be arranged in a comparatively narrow region that makes them difficult to process and close to the principal optical axis L of the light source, and can be formed by a flat surface that easily produces comparative accuracy. The reflecting surfaces 3A, 3B, 3C, 3D, 3E, and 3F of the second reflecting member 3, arranged in a comparatively wide region easy to process separated from the principal optical axis L of the light source, can be formed by a parabolic surface that does not easily produce comparative accuracy. According to the lens of the fifth exemplary embodiment, the accuracy of the reflecting surfaces 2A, 2B, 2C, 2D, 2E, and 2F of the first reflecting member 2 and the reflecting surfaces 3A, 3B, 3C, 3D, 3E, and 3F of the second reflecting member 3 can be improved while controlling manufacturing costs as compared to the case where the reflecting surfaces 2A, 2B, 2C, 2D, 2E, and 2F of the first reflecting member 2 are formed by a parabolic surface and the reflecting surfaces 3A, 3B, 3C, 3D, 3E, and 3F of the second reflecting member 3 are formed by a flat surface.

In the following, a sixth exemplary embodiment of a lens will be described. In like manner to the lens of the first exemplary embodiment, the lens of the sixth exemplary embodiment can be used for lamps of vehicles, traffic lights, amusement machines, general lighting, decorations, etc.

Figure 4A:
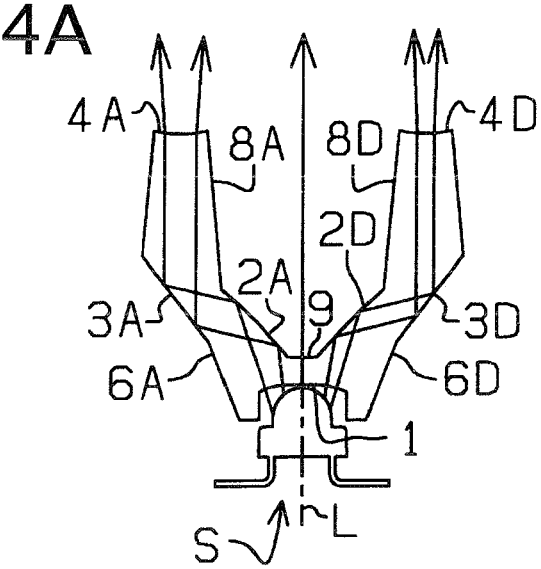
FIG. 4A is a cross-sectional view corresponding to the cross-sectional view of the lens taken along the line A-A of FIG. 1C of another embodiment.
Figure 4B:
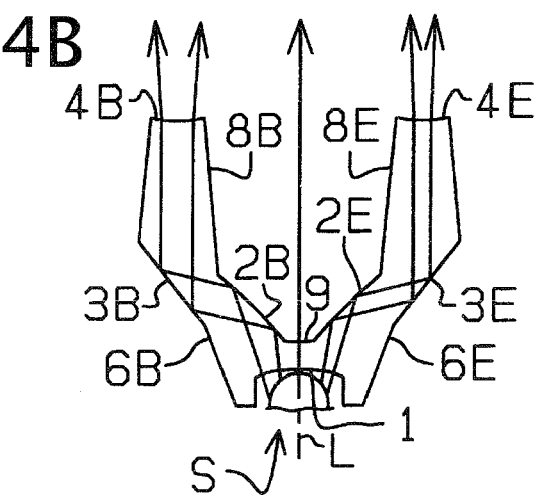
FIG. 4B is a cross-sectional view corresponding to the cross-sectional view of the lens taken along the line B-B of FIG. 1C of another embodiment.
Figure 4C:
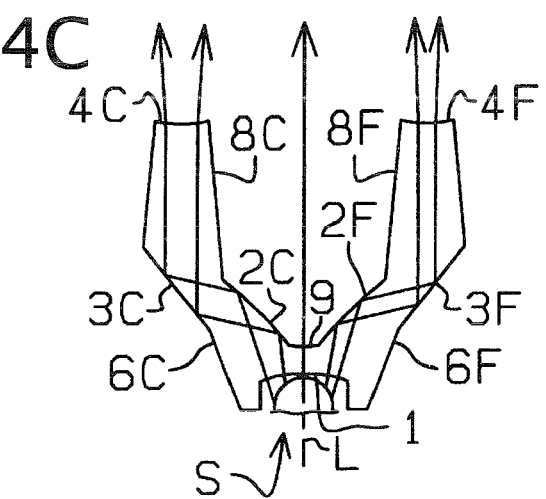
FIG. 4C is a cross-sectional view corresponding to the cross-sectional view of the lens taken along the line C-C of FIG. 1C of another embodiment.

FIGS. 4A to 4C show various views including a cross section of the lens and the LED unit of the sixth exemplary embodiment in like manner to FIGS. 3A to 3C. In more detail, FIG. 4A shows a cross-sectional view taken along a line corresponding to line A-A of FIG. 1C, FIG. 4B shows a cross-sectional view taken along a line corresponding to line B-B of FIG. 1C, and FIG. 4C shows a cross-sectional view taken along a line corresponding to line C-C of FIG. 1C. FIG. 5 is a front view of the lens of the sixth exemplary embodiment.

The reference numerals in FIGS. 4A to 4C and FIG. 5 identical to those in FIG. 1A to FIG. 3C represent parts or areas similar to or identical to those shown in FIG. 1A to FIG. 3C. The reference numeral 9 represents an irradiation surface of the light transmission member provided on the principal optical axis L of the light source to allow light from the light source to transmit.

As shown in FIGS. 4A to 4C and FIG. 5, in the lens of the sixth exemplary embodiment, the irradiation surface 9 of the light transmission member can be arranged on the inside of the reflecting surfaces 2A, 2B, 2C, 2D, 2E, and 2F of the first reflecting member 2. In other words, the irradiation surface 9 of the light transmission member is surrounded by the reflecting surfaces 2A, 2B, 2C, 2D, 2E, and 2F of the first reflecting member 2. Because of this, one part of the light from the input member 1 is irradiated from the irradiation surface 9 of the light transmission member as shown in detail in FIGS. 4A to 4C, and the remaining light from the input member 1 is irradiated from the irradiation surfaces 4A, 4B, 4C, 4D, 4E, and 4F of the irradiation member 4.

In addition, as shown in detail in FIG. 5, in the lens of the sixth exemplary embodiment the irradiation surfaces 4A, 4B, 4C, 4D, 4E, and 4F of the irradiation member 4 can be arranged so as to have a substantially rotationally symmetric relationship of 60° substantially centered on the principal optical axis L of the light source. The irradiation surface 9 of the light transmission member can be arranged on the principal optical axis L of the light source. The light transmission quantity of the light transmission member can be set such that the irradiation light from each of the six irradiation surfaces 4A, 4B, 4C, 4D, 4E, and 4F of the irradiation member 4 and the irradiation light from the irradiation surface 9 of the light transmission member is substantially uniform. Consequently, uniform light from the six vertices of a true hexagon and from a total of seven points, including a point at the center of this hexagon, can be irradiated using one light source. As a result, by preparing a plurality of lenses of the sixth exemplary embodiment, uniform light can be irradiated from all the irradiation surfaces 4A, 4B, 4C, 4D, 4E, 4F, and 9 arranged at regular intervals and emitted at points seven times the number of lenses. A plurality of lenses can form an equilateral triangle using two irradiation surfaces of one lens (for example, irradiation surfaces 4C, 4D) and one irradiation surface of another lens for example, irradiation surface 4A).

Even further, as shown in detail in FIGS. 4A to 4C, with the lens of the sixth exemplary embodiment the irradiation, surfaces 4A, 4B, 4C, 4D, 4E, 4F, and 9 can be formed in a concave shape. Because of this, light is irradiated from the upper edge (see FIG. 5) of each of the irradiation surfaces 4A, 4B, 4C, 4D, 4E, 4F, and 9 towards the forward upper side of FIG. 5 at an angle of, for example, 1520 with respect to the principal optical axis L of the light source. Light is also irradiated from the right edge (see FIG. 5) of each of the irradiation surfaces 4A, 4B, 4C, 4D, 4E, 4F, and 9 towards the forward right side of FIG. 5 at an angle of, for example, 45° with respect to the principal optical axis L of the light source. In addition, light is irradiated from the lower edge (see FIG. 5) of each of the irradiation surfaces 4A, 4B, 4C, 4D, 4E, 4F, and 9 towards the forward lower side of FIG. 5 at an angle of, for example, 15° with respect to the principal optical axis L of the light source. Light is also irradiated from the left edge (see FIG. 5) of each of the irradiation surfaces 4A, 4B, 4C, 4D, 4E, 4F, and 9 towards the forward left side of FIG. 5 at an angle of, for example, 45° with respect to the principal optical axis L of the light source. In other words, according to the irradiation surfaces 4A, 4B, 4C, 4D, 4E, 4F, and 9 formed in a concave shape, the light that travels up to the irradiation surfaces 4A, 4B, 4C, 4D, 4E, 4F, and 9 almost parallel to the principal optical axis L of the light source can be refracted and then radially irradiated. Namely, the distribution of light can be controlled by the irradiation surfaces 4A, 4B, 4C, 4D, 4E, 4F, and 9. Because of this, a plurality of irradiated light from the irradiation surfaces 4A, 4B, 4C, 4D, 4E, 4F, and 9 can be intermittently seen while allowing all portions of the plurality of irradiated light from the irradiation surfaces 4A, 4B, 4C, 4D, 4E, 4F, and 9 to be uniformly seen even if the position shifts outside the principal optical axis L of the light source.

Even further, as shown in detail in FIG. 5, in the lens of the sixth exemplary embodiment, although the exterior shape of the irradiation surfaces 4A, 4B, 4C, 4D, 4E, 4F, and 9 are formed in a circular shape, as an alternative with the lens of the seventh exemplary embodiment the external shape of the irradiation surfaces 4A, 4B, 4C, 4D, 4E, 4F, and 9 can be formed in a polygon such as a triangle or a square. According to the lens of the seventh exemplary embodiment, the distribution of the light irradiated from the irradiation surfaces 4A, 4B, 4C, 4D, 4E, 4F, and 9 can be more easily controlled than when the irradiation surfaces 4A, 4B, 4C, 4D, 4E, 4F, and 9 are formed in a circular shape as with the lens of the sixth exemplary embodiment.

In the following, an eighth exemplary embodiment of the lens unit will be described, which is equivalent to the light guiding unit assembly including a plurality of light guiding units. Namely, the lens unit of the eighth exemplary embodiment is three linked lenses of the first exemplary embodiment shown in FIG. 1A to FIG. 3C. In like manner to the first exemplary embodiment, the lens unit of the eighth exemplary embodiment can be used for lamps of vehicles, traffic lights, amusement machines, general lighting, decorations, etc.

Figure 6A:
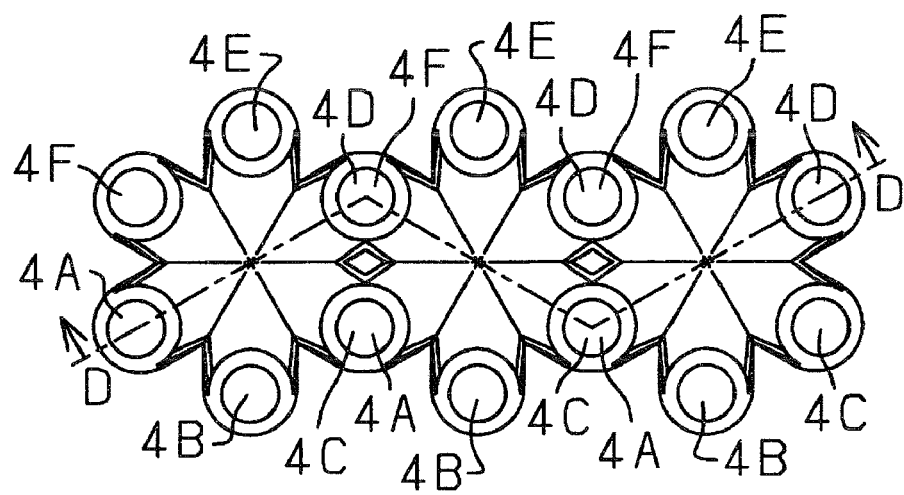
FIG. 6A is a front view of a lens unit (or a light guiding unit assembly) according to an eighth exemplary embodiment.
Figure 6B:
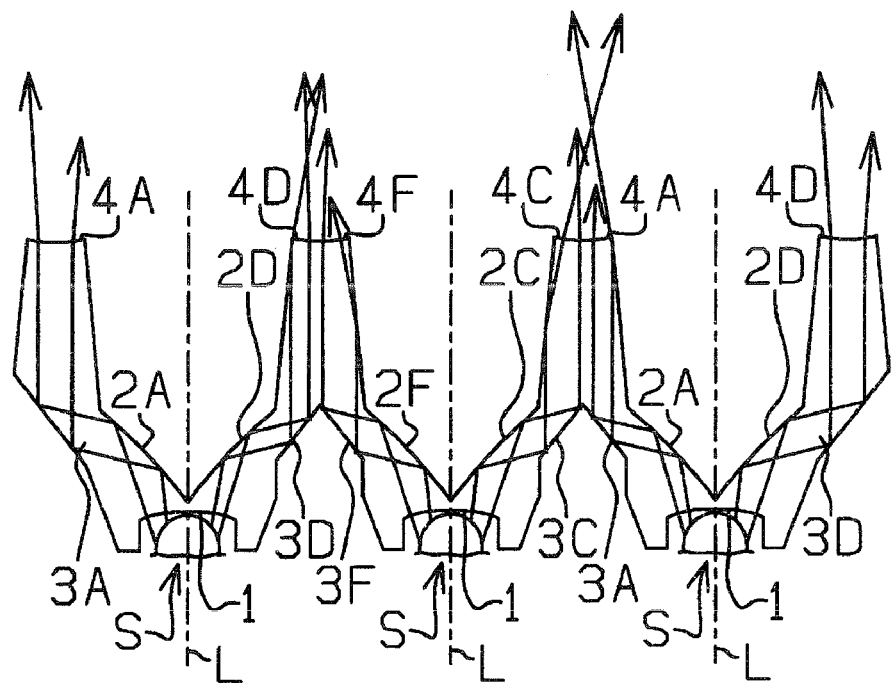
FIG. 6B is a cross-sectional view of the lens unit taken along the line D-D of FIG. 6A.

FIGS. 6A and 6B include various views of the lens unit of the eighth exemplary embodiment. In more detail, FIG. 6A is a front view of the lens unit of the eighth exemplary embodiment and FIG. 6B is a cross-sectional view taken along the line D-D of FIG. 6A. In FIGS. 6A and 6B, the reference numerals identical to those in FIG. 1 to FIG. 5 represent parts or areas similar or identical to those shown in FIG. 1 to FIG. 5.

As shown in FIGS. 6A and 6B, the lens unit of the eighth exemplary embodiment can include three linked lenses of the first exemplary embodiment. In more detail, from among the three lenses in FIG. 6A the irradiation surface 4C of the lens on the left side and the irradiation surface 4A of the lens at the center are shared (integrated), the irradiation surface 4D of the lens on the left side and the irradiation surface 4F of the lens at the center are shared (integrated), the irradiation surface 4C of the lens at the center and the irradiation surface 4A of the lens on the right side are shared (integrated), and the irradiation surface 4D of the lens at the center and the irradiation surface 4F of the lens on the right side are shared (integrated). Consequently, the assembly characteristics can be improved as compared to the case where each of the three lenses are individually mounted and the lamp assembled.

In the following, a ninth exemplary embodiment of the lens unit will be described. The lens unit of the ninth exemplary embodiment is three linked lenses of the sixth exemplary embodiment shown in FIGS. 4A and 4B and FIG. 5. In like manner to the lens of sixth exemplary embodiment, the lens unit of the ninth exemplary embodiment can be used for lamps of vehicles, traffic lamps, amusement machines, general lighting, decorations, etc.

Figure 7A:
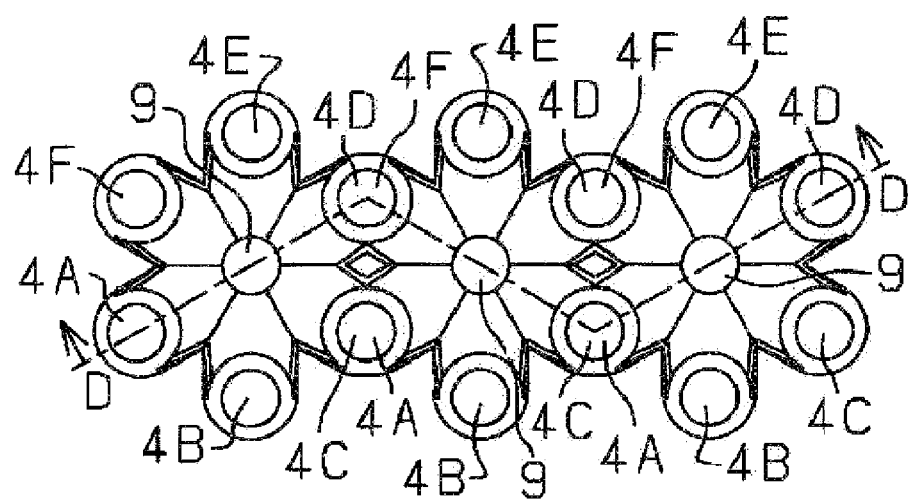
FIG. 7A is a front view of a lens unit (or a light guiding unit assembly) according to a ninth exemplary embodiment.
Figure 7B:
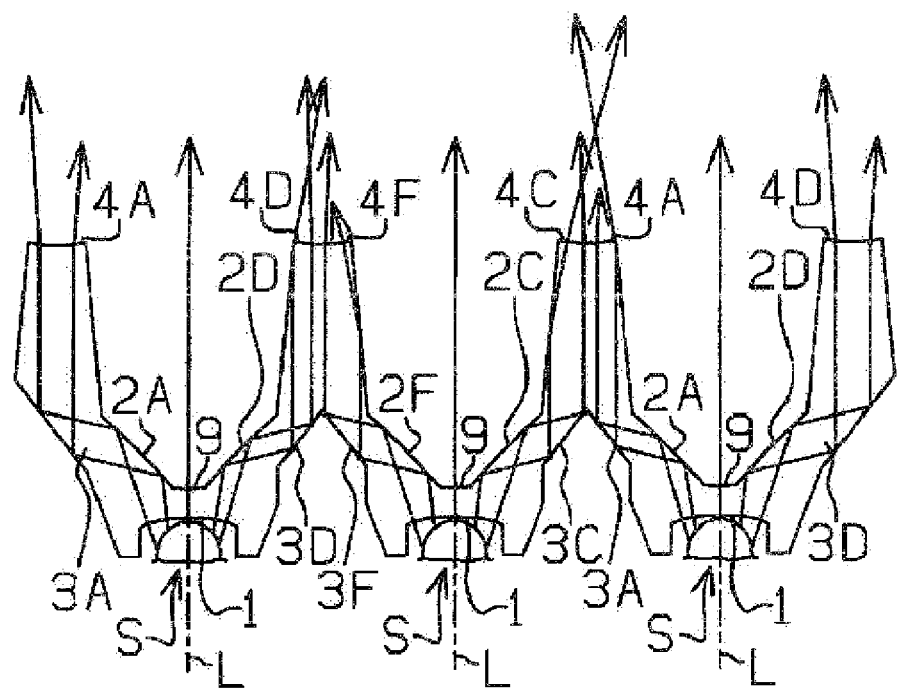
FIG. 7B is a cross-sectional view of the lens unit taken along the line D-D of FIG. 7A.

FIGS. 7A and 7B include various views of the lens unit of the ninth exemplary embodiment. In more detail, FIG. 7A is a front view of the lens unit of the ninth exemplary embodiment and FIG. 7B is a cross-sectional view taken along the line D-D of FIG. 7A. In FIGS. 7A and 7B, the reference numerals identical to those in FIG. 1A to FIG. 6B represent parts or areas similar or identical to those shown in FIG. 1A to FIG. 6B.

As shown in FIG. 7A, in the lens unit of the ninth exemplary embodiment the use of three light sources makes it possible to irradiate almost uniform light from 14 irradiation surfaces positioned at the vertex of a true hexagon and from three irradiation surfaces positioned at the center of a true hexagon for a total of 17 irradiation surfaces. In more detail, the use of one lens unit makes it possible to irradiate almost uniform light from the irradiation surfaces 4A, 4B, 4C, 4D, 4E, 4F, and 9 arranged at regular intervals to differentiate 18 equilateral triangles.

Because the lenses of the first to seventh exemplary embodiments as well as the lens units of the eighth and ninth exemplary embodiments are equipped with the portions that have an approximate column shape 6A, 6B, 6C, 6D, 6E, 6F, 8A, 8B, 8C, 8D, 8E, and 8F, lamps which use the lenses of the first to seventh exemplary embodiments or the lens units of the eighth and ninth exemplary embodiments can have a three-dimensional appearance when a light source is lit and unlit.

In addition, because light that is irradiated from the irradiation surfaces 4A, 4B, 4C, 4D, 4E, 4F, and 9 creates lights source that outnumber the LEDs serving as a light source, lamps which use the lenses of the first to seventh exemplary embodiments or the lens units of the eighth and ninth exemplary embodiments can effectively utilize the luminous flux of the LED.

Although a single LED is arranged inside the LED unit S with the lenses of the first to the seventh exemplary embodiment or the lens units of the eighth and the ninth exemplary embodiments, a plurality of LEDs with different colors can be arranged inside the LED unit S and the plurality of LEDs lit simultaneously or using different timing.

Figure 8:
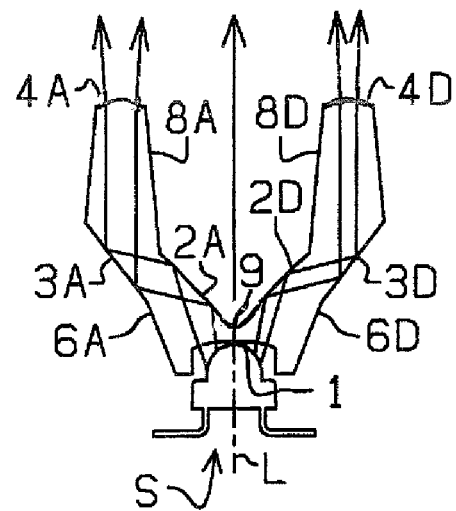
FIG. 8 is a cross section view of a lens according to another embodiment.

FIG. 8 shows yet another embodiment of a lens in which irradiation surfaces 4A and 4D are convex surfaces. All or part of the total number of irradiation surfaces 4A-4D can include this concave, flat, or convex surfaces. The irradiation surface of the light transmission member 9 is formed as a concave surface in this embodiment. Of course, the irradiation surface of the light transmission member 9 could also be a convex or flat surface in various combinations with the convex, flat, and/or concave irradiation surfaces 4A-4D.

Figure 9:
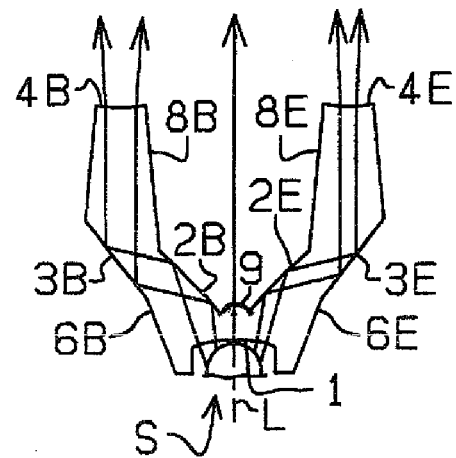
FIG. 9 is a cross section view of a lens according to another embodiment.

FIG. 9 shows another embodiment of a lens in which the irradiation surface of the light transmission member is convex while the irradiation surfaces 4A-4D are concave.

Figure 10:
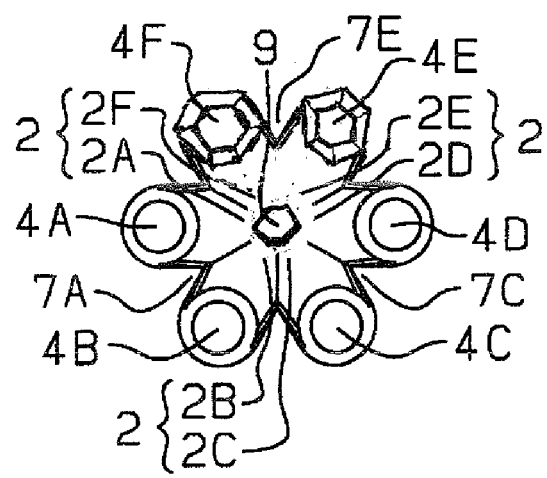
FIG. 10 is a front view of a lens according to another embodiment.

FIG. 10 shows another embodiment of a lens in which the top view shape of the irradiation surfaces 4E and 4F are polygonal, e.g., hexagonal. The shape of the irradiation surfaces 4A-4D can also be the same shape or they can be varied among each other, as shown in FIG. 10. In addition, other polygonal shapes could be used, such as square, rectangular, triangular, octagonal, etc. In addition, the irradiation surfaces 4A-4D could be shaped in non-symmetrical ways to form various shapes, letters, numbers, symbols, etc.

In the foregoing exemplary embodiments, the lens and the lens unit can be formed of any material suitable for an ordinary lens, including a glass, a resin material, and the like.

In the foregoing description, the lens and the lens unit are exemplified as a light guiding unit and a light guiding unit assembly. However, the present invention is not limited thereto. For example, the light guiding unit can be a hollow light guiding unit including reflecting surfaces, along with various other possible configurations.

In the foregoing description, LEDs are exemplified as the light source, to which the present invention is not limited. Examples of the light source includes, but are not limited to, ordinary lamps such as discharge lamps, fluorescent lamps, halogen lamps, and incandescent lamps, electroluminescent devices, and the like.

While there has been described what are at present considered to be exemplary embodiments of the invention, it will be understood that various modifications may be made thereto, and it is intended that the appended claims cover all such modifications as fall within the true spirit and scope of the invention.

What is claimed is:

1. A light guiding device made from a solid transparent material for use with a light source, comprising:
   an input portion made from the solid transparent material where light from the light source is input such that light travels though the solid transparent material;
   a first reflecting portion having at least three primary reflecting surfaces configured to divide light received from the input portion into at least three directions within the solid transparent material and to radially reflect the light;
   a second reflecting portion having at least three secondary reflecting surfaces, the secondary reflecting surfaces provided equal in number to the primary reflecting surfaces of the first reflecting portion and in correspondence to the primary reflecting surfaces of the first reflecting portion in order to reflect light received from each primary reflecting surface of the first reflecting portion in a direction substantially parallel to a principal optical axis of the light source; and
   an irradiation portion having at least three irradiation surfaces provided equal in number to the secondary reflecting surfaces of the second reflecting portion and in correspondence to the secondary reflecting surfaces of the second reflecting portion in order to irradiate light received from each secondary reflecting surface of the second reflecting portion, wherein
   the irradiation surfaces of the irradiation portion are separated from each other on a circumference substantially centered on the principal optical axis of the light source, and
   the secondary reflecting surfaces of the second reflecting portion and the irradiation surfaces of the irradiation portion are arranged such that at least three light paths are formed from the first reflecting portion to the irradiation surfaces of the irradiation portion and the light paths have a substantially rotationally symmetric relationship with each other substantially centered on the principal optical axis of the light source.

2. The light guiding device according to claim 1, wherein an optical isolation space is arranged between,
   a light path portion extending from one of the primary reflecting surfaces of the first reflecting portion to a corresponding one of the secondary reflecting surfaces of the second reflecting portion, and
   a second light path portion extending from another one of the primary reflecting surfaces of the first reflecting portion to a corresponding one of the secondary reflecting surfaces of the second reflecting portion.

3. The light guiding device according to claim 2, wherein:
   the light path portion is formed as an approximate column shape; and
   the second light path portion is formed in an approximate column shape that branches from the approximate column shape of the light path portion.

4. The light guiding device according to claim 1, wherein an optical isolation space is arranged between,
   a primary light path portion extending from one of the second reflecting surfaces of the second reflecting portion to a corresponding one of the irradiation surfaces of the irradiation portion, and
   a secondary light path portion extending from another one of the reflecting surfaces of the second reflecting portion to a corresponding one of the irradiation surfaces of the irradiation portion.

5. The light guiding device according to claim 4, wherein:
   the primary light path portion is formed as an approximate column shape; and
   the secondary light path portion is formed as an approximate column shape.

6. The light guiding device according claim 1, further comprising:
   a light transmission portion that allows light to transmit from the light source, the light transmission portion being located on the principal optical axis of the light source, and wherein:
   the first reflecting portion is arranged about a periphery of the light transmission portion;
   the number of the primary reflecting surfaces provided on the first reflecting portion is six so as to divide the light from the input portion into six directions and then radially reflect the light; and
   the six primary reflecting surfaces of the first reflecting portion are arranged such that they have a substantially rotationally symmetric relationship spacing of substantially 60° substantially centered on the principal optical axis of the light source.

7. The light guiding device according to claim 6, wherein the light transmission portion includes an irradiation surface, and
   a light transmission quantity though the light transmission portion is set such that irradiation light from each irradiation surface of the irradiation portion and irradiation light from the irradiation surface of the light transmission portion are substantially uniform.

8. The light guiding device according to claim 1, further comprising:
   a light transmission portion located on the principal optical axis of the light source including an irradiation surface; and
   at least one of, the irradiation surfaces of the irradiation portion and the irradiation surface of the light transmission portion, is formed in at least one of a convex shape and a concave shape.

9. The light guiding device according to claim 8, wherein an exterior shape of at least one of, the irradiation surfaces of the irradiation portion and the irradiation surface of the light transmission portion, is formed in at least one of a polygon shape and a cylindrical shape.

10. The light guiding device according to claim 1, wherein a cover of the light source and the input portion are formed integrally.

11. The light guiding device according to claim 1, wherein each primary reflecting surface of the first reflecting portion includes a flat surface and each secondary reflecting surface of the second reflecting portion includes a parabolic surface defined by rotating a substantial parabola centered on a predetermined axis.

12. The light guiding device according to claim 1, wherein the device is formed as a lens, and the first reflecting portion, second reflecting portion, and irradiation portion are made from the solid transparent material.

13. A light guiding device assembly comprising a plurality of the light guiding devices according to claim 1, wherein the light guiding devices are connected, and wherein adjacent light guiding devices include at least one irradiation surface that is shared.

14. A lamp comprising the light guiding device according to claim 1, the lamp including a housing and a light source.

15. A lamp comprising the light guiding device assembly according to claim 13, the lamp including a housing and a light source.

16. The light guiding device of claim 1, wherein the input portion, the first reflecting portion, the second reflecting portion, and the irradiation portion are all formed integrally with each other.

17. The light guiding device according to claim 2, wherein another optical isolation space is arranged between,
   a primary light path portion extending from one of the second reflecting surfaces of the second reflecting portion to a corresponding one of the irradiation surfaces of the irradiation portion, and
   a secondary light path portion extending from another one of the reflecting surfaces of the second reflecting portion to a corresponding one of the irradiation surfaces of the irradiation portion.

18. The light guiding device according claim 2, further comprising:
   a light transmission portion that allows light to transmit from the light source, the light transmission portion being located on the principal optical axis of the light source, and wherein:
   the first reflecting portion is arranged about a periphery of the light transmission portion;
   the number of the primary reflecting surfaces provided on the first reflecting portion is six so as to divide the light from the input portion into six directions and then radially reflect the light; and
   the six primary reflecting surfaces of the first reflecting portion are arranged such that they have a substantially rotationally symmetric relationship spacing of substantially 60° substantially centered on the principal optical axis of the light source.

19. The light guiding device according to claim 2, further comprising:
   a light transmission portion located on the principal optical axis of the light source including an irradiation surface; and
   at least one of, the irradiation surfaces of the irradiation portion and the irradiation surface of the light transmission portion, is formed in at least one of a convex shape and a concave shape.

\* \* \* \* \*